United States Patent [19]

Beauch

[11] Patent Number: 4,805,478
[45] Date of Patent: Feb. 21, 1989

[54] STEERING COLUMN FOR VEHICLE WITH MULTITUBE ENERGY ABSORBING MAST JACKET

[75] Inventor: Howard D. Beauch, Frankenmuth, Mich.

[73] Assignee: General Motors Corporation, Detroit, Mich.

[21] Appl. No.: 66,612

[22] Filed: Jun. 26, 1987

[51] Int. Cl.$^4$ ............................................... B62D 1/18
[52] U.S. Cl. ...................................................... 74/492
[58] Field of Search ........................................... 74/492

[56] References Cited

U.S. PATENT DOCUMENTS

| | | | |
|---|---|---|---|
| 3,392,599 | 7/1968 | White | 74/492 |
| 3,538,783 | 11/1970 | Butts | 74/492 |
| 3,788,148 | 1/1974 | Connell et al. | 74/492 |
| 4,006,647 | 2/1977 | Oonuma et al. | 74/492 |
| 4,028,961 | 6/1977 | Utsumi et al. | 74/492 |
| 4,066,149 | 1/1978 | Mazelsky | 74/492 |
| 4,445,708 | 5/1984 | Oakes et al. | 74/492 |

Primary Examiner—Leslie A. Braun
Assistant Examiner—Scott Anchell
Attorney, Agent, or Firm—Saul Schwartz

[57] ABSTRACT

A collapsible steering column for automobiles including a plurality of mast jacket cylinders which are arranged in telescopic configuration with cylinder deforming units operatively mounted therebetween having rollable deformer balls active throughout telescopic collapse of the mast jacket into an optimized collapsed length to provide increased and energy absorption stroke over a given column length.

1 Claim, 1 Drawing Sheet

U.S. Patent
Feb. 21, 1989
4,805,478
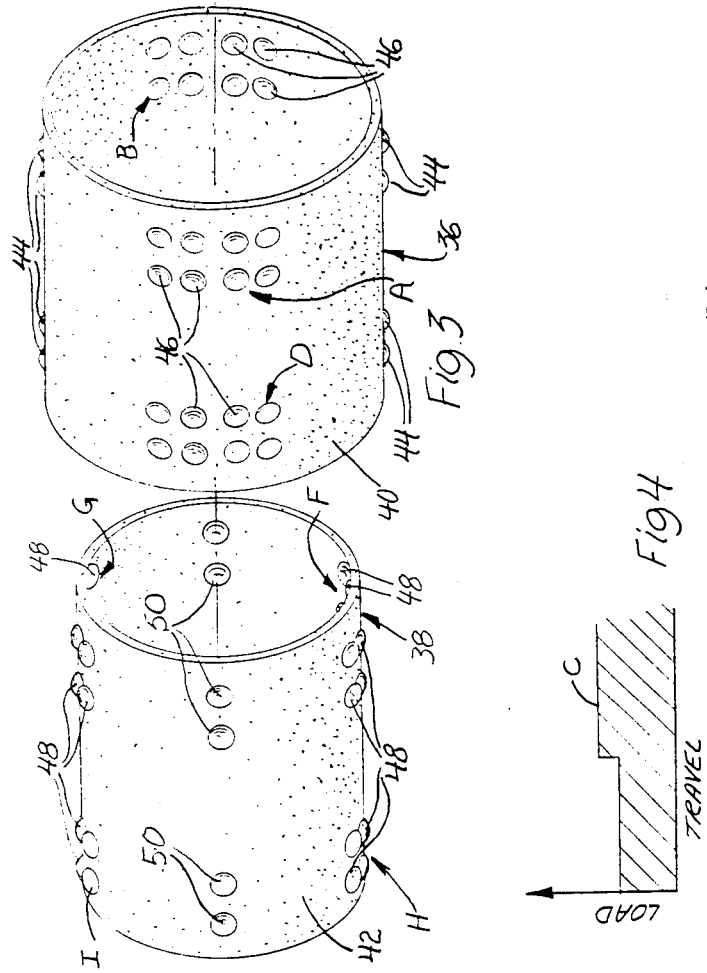
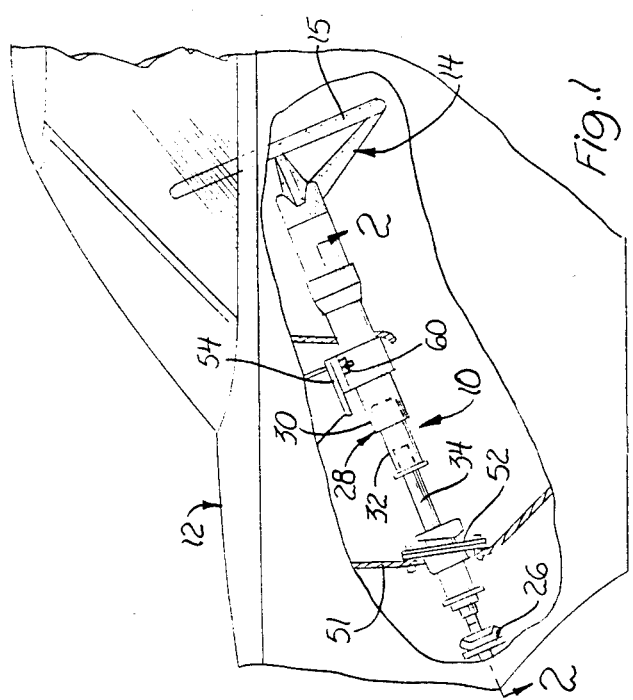
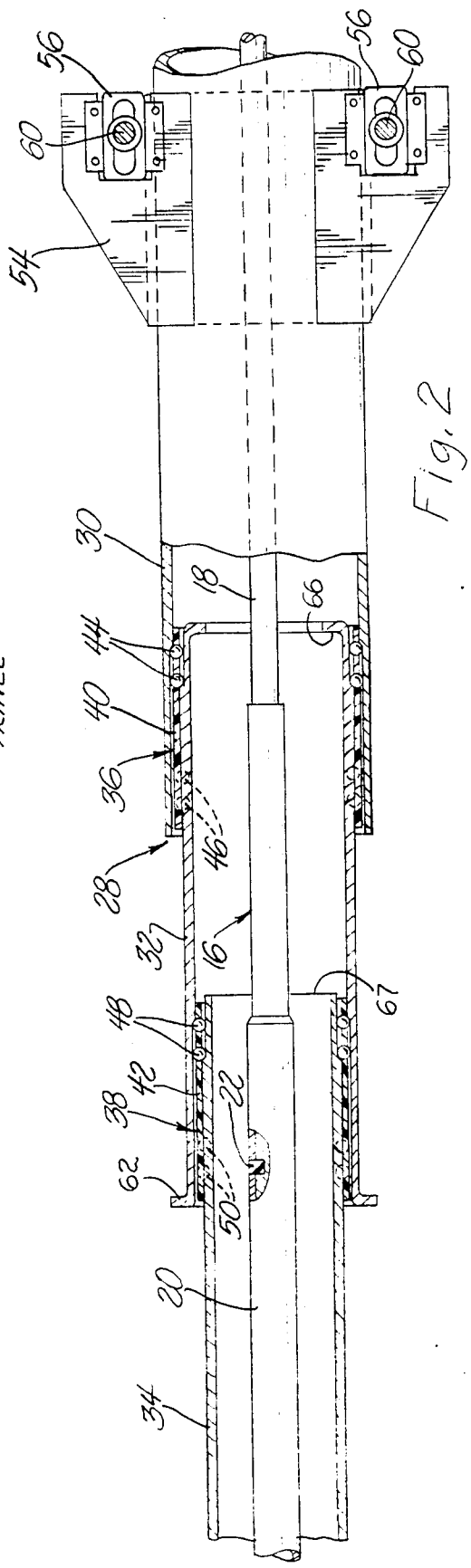

STEERING COLUMN FOR VEHICLE WITH MULTITUBE ENERGY ABSORBING MAST JACKET

This invention relates steering columns for automotive vehicles and more particularly to a steering column with a multi-tube, energy absorbing mast jacket that telescopes under load from an optimized steering wheel position to an optimized collapsed length with effective dissipation of load energy.

Various vehicle steering columns such as disclosed in U.S. Pat. No. 3,392,599, issued July 16, 1968 to R. L. White, generally have a telescopically collapsible energy absorbing mast jacket that extend from a forward bulkhead to a steering wheel within the vehicle. The mast jacket is generally comprised of a pair of telescopically arranged tubes which are operatively interconnected by a ball and sleeve assembly or other deforming device that normally holds the tubes in an extended position and permits the tubes to telescopically collapse under predetermined loads. When a load over the predetermined build magnitude telescopes the mast jacket, the steel or other material of the mast jacket tubes is worked by the deforming device to dissipate the energy effecting mast jacket collapse.

The present invention is of the general category as the column described in the above referenced U.S. Pat. No. 3,392,599 but advantageously utilizes at least three telescopically arranged tubular members for the mast jacket which are of the same overall assembled length as the referenced dual tube design. With the multiple tube configuration of the present invention, the energy absorbing collapse distance of the jacket is optimized to increase energy absorption stroke without adding to the overall column length. Furthermore, the multi-tube design of this invention provides a mast jacket assembly capable of staged and dual collapsed load without involving special manufacturing processes or complex and costly components. The design importantly can provide a stepped increase in energy dissipation provided by the second stage of operation.

The mast jacket of a preferred embodiment of this invention consists of three elongated, cylindrical tubes, of steel or other suitable material, that are assembled in a telescopic extended configuration. Two ball sleeves, operatively interfitted between the upper and intermediate tubes and between the intermediate and lower tubes are used to deform and work the material of the jacket assembly when the mast assembly is telescopically stroked under load. Two brackets mount the mast jacket of the steering column assembly in the vehicle. The upper tube of the mast jacket, when collapsed, travels over the intermediate tube of the jacket in a first stage of operation until it impacts a stop thereon. At this point, the upper and intermediate tubes begin to move as a unit onto the lower tube in a second stage of operation with increased level of energy absorption. The upper and intermediate tubes continue to telescope over the lower tube until a stop in the intermediate tube contacts the end of the lower tube. This is predicated on selecting and varying the build loads between the three tubes of the mast jacket. Build loads may be provided by the selective changes in ball diameter, by selection of material hardness and the degree of clearance between the various tubular jackets.

With the present invention, there is an optimized increase in collapse capability of the mast jacket assembly without any increase in length of this assembly as compared to the prior dual mast jacket assembly. Furthermore, there are predetermined two stage loads and a controlled collapse of the system due to the dual build loads provided by this system. With the present invention, manufacture is facilitated due to the simplicity of components and the fact that such components are available for employment in this design. With the present invention, the dual build loads allows the design to be tailored to requirements where a greater collapse length and staged energy absorption is required. With this invention, side loading and off-center impacts can be built into the system. By the change of ball orientation with the ball sleeves efficiency of the energy absorbing sections of the jacket assembly is maximized.

These and other features, objects and advantages of this invention will be more apparent from the following detailed description and drawing in which:

FIG. 1 is a partially broken away and fragmentary elevational view of an automotive vehicle body including a steering column assembly having an energy absorbing mast jacket arranged according to this invention.

FIG. 2 is an enlarged partially broken away view taken generally along the plane indicated by lines 2—2 of FIG. 1.

FIG. 3 is a pictorial view of a preferred arrangement of upper and lower ball sleeve assemblies of this invention.

FIG. 4 is a load vs. time curve illustrating operation of a preferred embodiment of the invention.

Turning now in greater detail to the drawing, FIG. 1 illustrates an energy absorbing steering column 10 operatively mounted within an automotive vehicle 12 and having a hand wheel 14 having an annular rim 15 that can be manually turned by a vehicle operator for steering the dirigible road wheels of the vehicle. The hand wheel 14 is mounted to the upper end of a steering shaft assembly 16 which includes an upper shaft 18 mounted for telescopic movement in a tubular lower shaft 20. The upper and lower steering shafts have conventional mating flats, not shown, so that the two shafts turn as an assembly when the steering wheel is turned. The upper and lower steering shafts are held in an outer position by break away plastic connector 22 which shears on application of a predetermined load to the steering shaft assembly to allow these parts to telescopically collapse. The lower steering shaft is connected by a flexible coupling 26 to a steering gear which in turn is drivingly connected by conventional steering gear linkage to the dirigible road wheels of a vehicle, all of which are conventional and are not shown.

In addition to the steering shaft assembly 16, the steering column 10 comprises a mast jacket assembly 28 comprised of interfitting upper, intermediate and lower tubular mast jackets 30, 32, and 34 preferably of steel which have stepped diameter from the lower mast jacket to the upper to telescope together under impact loads of predetermined magnitude. As shown in FIG. 2, the upper end portion of the lower jacket or tube 34 slidably fits into the lower end portion of the intermediate jacket or tube 32. In turn, the upper end portion of the intermediate tube 32 slidably fits into the lower end portion of the upper tube 30. Interposed between these end portions are upper and lower deforming ball and sleeve assemblies 36 and 38 which are differently sized diametrically to operatively fit the different clearance diameters of the mast jacket tubes as shown in the drawing. Each of these assemblies comprises a tubular sleeve 40 or 42 of nylon or other suitable material in which sets of steel balls 44, 46 or 48, 50 are rotatably mounted. The balls of the upper deforming ball and sleeve assembly may be of a diameter less than that of the lower ball and sleeve assembly to provide reduced resistance to telescoping of the mast jacket in a first stage of operation. These balls, however, have a diameter which is greater than the normal diametral clearance between the end portions of the mast jacket tubes so that only short linear tracks are initially formed during assembly in the mating inner surfaces of the mast jacket tubing when they are initially assembled together as shown in FIG. 2. With such construction and when telescoped under loads, the balls of the ball sets continue the linear tracks and deform the metal of the jackets to dissipate energy at a predetermined level.

As best shown in FIG. 1, the lower mast jacket tube 34 is mounted to a front bulkhead 51 in vehicle 12 by conventional bracket construction 52. The upper mast jacket tube 30 has a bracket 54 welded or otherwise affixed thereto which carries release capsules 56. These capsules attach to the lower portion of the instrument panel 58 by bolts 60 such as described in the above referenced U.S. Pat. No. '599.

On application of a load to the steering wheel exceeding a predetermined load, the capsules 56 pull out of the release the column which begin to telescope together. As this initial telescopic movement occurs, the upper tube of the mast jacket travels in a first stage of operation and the sets of balls 44, 46 work the metal of tubes 30 and 32 to dissipate energy at a first level until it meets a stop 62 on the intermediate jacket. At this point, the upper and intermediate jackets begin to move as a unit onto the lower jacket. The upper and intermediate jacket then telescope over the lower jacket in a second stage of operation to dissipate energy at a higher level until a stop 66 in the intermediate jacket contacts the upper end 67 of the lower jacket. This chain of events is shown in the load travel curve C of FIG. 4 with energy dissipation being the area under curve C. This operation is predicated on the build up load between the tubes of the jacket. For example, if the upper ball sleeve creates a build load of 800 pounds and the lower ball sleeve creates a build load of 1000 pounds, then the jacket assembly would collapse as described. If the loads of the ball sleeves were reversed, the collapse sequence would be reversed. In any event, there is staged energy absorption and an important increase in collapse and energy dissipating capability without any increase in length as compared to the double tube mast jacket assembly. Furthermore, there are predetermined loads and a controlled collapse of this system due to the dual build loads provided by the system. With this invention, manufacture is facilitated in view of the straight forward nature of the components and existing components can be employed in this design. The dual build load allows this design to be tailored to fit into specific vehicles where required. This design is adaptable to constructions which would inhibit collapse from side loads. In a preferred embodiment of this invention, the sets of deformer balls are oriented within the ball sleeve to maximize the efficiency of the energy absorbing sections of the jacket assembly and will help control column collapse during offset impacts and side loadings.

To this end, the upper ball sleeve 40 may have balls 46 in diametrically opposing larger or major load carrying sets such as opposing sets A and B as shown in FIG. 3. Set A may be located at a 12 o'clock position in the upper end of sleeve 40 and opposite to set B at a 6 o'clock position. The same orientation may be used for set D and a diametrically opposing set, not shown, at the lower end of sleeve 40. The balls 44 at 3 and 9 o'clock are reduced in number and are minor sets which only carry light loads. The lower sleeve 42 has its ball arrangement opposite to the ball arrangement of the upper sleeve. More particularly as shown in FIG. 3, the sleeve 42 has balls 48 arranged in major load carrying sets F, G, H and I at 3 and 9 o'clock positions while the balls 50 are sets located at the 12 and 6 o'clock positions to carry light loads. With this arrangement of ball sets, there is effective dissipation of load energy whether directed to the center of the mast jacket or off center. On center loads would cause the mast jacket to telescope as described above. An off center load such as directed to a 9 o'clock position on the rim 15 of hand wheel 14 may result in sets of balls H and I initially working the lower and intermediate metallic sleeves if there is any appreciable binding between the upper and intermediate tubes. Speed and momentum would subsequently cause the telescoping of the upper and intermediate tubes.

Rotating the ball sleeves to selected proper and predetermined orientation, the mast jacket is more capable of handling impact loads from the side or off-center, as well as the normal on-center impacts. The column is more versatile in all axes under impacts that will produce a load capable of collapsing the jacket. In any event, there is, in effect, a 360° coverage with this arrangement to improve dissipation of offset or side load energy while the column is strengthened so there is increased resistance to buckling from excessive side loads.

While a preferred embodiment of this invention has been show and described for illustration purposes, other modifications will become apparent to those skilled in the art. Accordingly, the scope of this invention is set forth in the following claims.

The embodiments of the invention in which an exclusive property or privilege is claimed are defined as follows:

1. An energy absorbing steering column assembly for a vehicle comprising first, second and third telescopically related metallic tubes having first and second deformer units operatively mounted respectively between an upper and intermediate tube and between the intermediate and lower tubes, said first deformer unit comprising a first cylindrical sleeve having a complement of balls therein adjacent opposite ends thereof located at opposing diametrical positions of said first cylindrical sleeve, said second deformer unit comprising a second cylindrical sleeve having a complement of balls therein adjacent opposite ends thereof located at opposing diametrical positions of said second cylindrical sleeve and arcuately offset with respect to said complement of balls in said first cylindrical sleeve of said first deformer unit, said complement of balls in said first deformer unit rolling paths in the interfacing walls of said first and second tubes in a first stage of energy absorption upon application of a predetermined load telescopically collapsing said first and second tubes with respect to one another and said complement of balls in said second deformer unit rolling paths in the interfacing walls of said second and third tubes in a second stage of energy absorbing operation to provide optimized energy absorption stroke as said column assembly is collapsed from an extended position toward a fully telescoped position.

* * * * *